United States Patent
Luan et al.

(10) Patent No.: US 10,891,928 B2
(45) Date of Patent: Jan. 12, 2021

(54) AUTOMATIC SONG GENERATION

(71) Applicant: MICROSOFT TECHNOLOGY LICENSING LLC, Redmond, WA (US)

(72) Inventors: Jian Luan, Redmond, WA (US); Qinying Liao, Redmond, WA (US); Zhen Liu, Redmond, WA (US); Nan Yang, Redmond, WA (US); Furu Wei, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/500,995

(22) PCT Filed: Apr. 18, 2018

(86) PCT No.: PCT/US2018/028043
§ 371 (c)(1),
(2) Date: Oct. 4, 2019

(87) PCT Pub. No.: WO2018/200267
PCT Pub. Date: Nov. 1, 2018

(65) Prior Publication Data
US 2020/0035209 A1   Jan. 30, 2020

(30) Foreign Application Priority Data
Apr. 26, 2017  (CN) .......................... 2017 1 0284177

(51) Int. Cl.
*G10H 1/00* (2006.01)
*G06N 20/00* (2019.01)
*G10H 1/36* (2006.01)

(52) U.S. Cl.
CPC ........... *G10H 1/0025* (2013.01); *G06N 20/00* (2019.01); *G10H 1/368* (2013.01);
(Continued)

(58) Field of Classification Search
CPC ................. G10H 1/0025; G10H 1/368; G10H 2250/455; G10H 2220/011;
(Continued)

(56) References Cited

U.S. PATENT DOCUMENTS 5,525,062 A  6/1996  Ogawa et al.
5,747,715 A  5/1998  Ohta et al.
(Continued)

FOREIGN PATENT DOCUMENTS

JP  2002202779 A  7/2002

OTHER PUBLICATIONS

Thayakaran, et al., "Lyric Generation using Artificial Intelligence", In Special Issue of Engineering and Scientific International Journal, May 2015, pp. 61-64.
(Continued)

*Primary Examiner* — Jeffrey Donels
(74) *Attorney, Agent, or Firm* — Workman Nydegger

(57) ABSTRACT

In accordance with implementations of the subject matter described herein, there is provided a solution for supporting a machine to automatically generate a song. In this solution, an input from a user is used to determine a creation intention of the user with respect to a song to be generated. Lyrics of the song are generated based on the creation intention. Then, a template for the song is generated based at least in part on the lyrics. The template indicates a melody matching with the lyrics. In this way, it is feasible to automatically create the melody and lyrics which not only conform to the creation intention of the user but also match with each other.

20 Claims, 3 Drawing Sheets

(52) U.S. Cl.
CPC .. *G10H 2210/111* (2013.01); *G10H 2210/151* (2013.01); *G10H 2220/011* (2013.01); *G10H 2250/455* (2013.01)

(58) Field of Classification Search
CPC ....... G10H 2210/151; G10H 2210/111; G10H 2240/131; G10H 2240/085; G10H 2210/125; G10H 2220/441; G10H 2210/101; G10H 7/00; G06N 20/00; G10L 13/02
See application file for complete search history.

(56) References Cited

U.S. PATENT DOCUMENTS

| | | | |
|---|---|---|---|
| 5,895,449 | A | 4/1999 | Nakajima et al. |
| 6,424,944 | B1 | 7/2002 | Hikawa |
| 7,977,562 | B2 | 7/2011 | Qian et al. |
| 8,244,546 | B2 | 8/2012 | Nakano et al. |
| 8,706,488 | B2 | 4/2014 | Edgington et al. |
| 2010/0162879 | A1 | 7/2010 | Marcus |
| 2013/0218929 | A1 | 8/2013 | Kilachand |
| 2014/0174279 | A1* | 6/2014 | Wong .................. G10H 1/0025 84/609 |
| 2015/0025892 | A1 | 1/2015 | Lee et al. |
| 2017/0092247 | A1 | 3/2017 | Silverstein |
| 2018/0322854 | A1* | 11/2018 | Ackerman ............. G06N 7/005 |
| 2018/0366097 | A1* | 12/2018 | Sharp ................ G06Q 30/0269 |

OTHER PUBLICATIONS

"High Quality Singing Synthesis using the Selection-based Synthesis Scheme", In Thesis Submitted to University of Tokyo, Sep. 1999, 2 pages.

Huang, et al., "A Research of Automatic Composition and Singing Voice Synthesis System for Taiwanese Popular Songs", In Proceedings of 40th International Computer Music Conference, Sep. 14, 2014, pp. 1326-1331.

"International Search Report and Written Opinion Issued in PCT Application No. PCT/US18/028043", dated Jul. 18, 2018, 56 Pages.

* cited by examiner

AUTOMATIC SONG GENERATION

BACKGROUND

Songs are an artistic form appreciated and loved by people and have been part of people's life. However, song creation is still a complex process. Generally speaking, a song creation process includes two major phases, that is, lyrics writing (namely, generating lyrics) and melody composition (namely, generating a melody). Conventional melody composition requires composers to have music theory knowledge and create a complete song melody by inspirations and creation experiences. Creating a sweet-sounding melody has many requirements in music theory, for example, ensuring the melody and rhythm uniform, representing a certain theme, and reflecting various music styles or combinations of the styles, and/or the like. In addition, lyrics, as an important part of the songs, are also required to express certain meanings, correspond to the themes, and match with the melody of the songs. In this sense, high music theory requirements are imposed on a creator to generate songs having specific styles and emotions and representing specific themes.

SUMMARY

In accordance with implementations of the subject matter described herein, there is provided a solution for supporting a machine to automatically generate a song. In this solution, an input from a user is used to determine a creation intention of the user with respect to a song to be generated. Lyrics of the song are generated based on the creation intention. Then, a template for the song is generated based at least in part on the lyrics. The template indicates a melody matching with the lyrics. In this way, it is feasible to automatically create the melody and lyrics which not only conform to the creation intention of the user but also match with each other.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As discussed above, there are so many requirements for melody and/or lyrics of songs in order to create a song, and these requirements limit the possibility of ordinary people or organizations in creating personalized songs. In many cases, ordinary people or organizations usually need to resort to professional persons and organizations capable of writing lyrics and composing melody if they want to obtain customized songs. As computer era comes, especially as artificial intelligence develops, it is desirable to generate desired songs, for example, generating melody and/or lyrics of the songs automatically.

In accordance with some implementations of the subject matter described herein, there is provided a solution of supporting a machine to automatically generate a song. In this solution, an input from a user, such as an image, a word, a video, and/or an audio, is used to determine a creation intention of the user with respect to song creation. Such creation intention input by the user is further used to guide generation of lyrics of the song so that the generated lyrics can express the creation intention. Furthermore, a template for the song may be generated based on the lyrics, the template indicating a melody matching with the lyrics. According to the solution of the subject matter described herein, since the generated lyrics match with the melody, the melody may be directly combined together with the lyrics into a song that can be sung. In addition, the lyrics, melody, and/or song generated based on the input from the user all can reflect the creation intention of the user; thus, a personalized and high-quality song, lyrics and/or melody can be provided to the user.

Basic principles and various example implementations of the subject matter described here will now be described with reference to the drawings.

Example Environment

Figure 1:
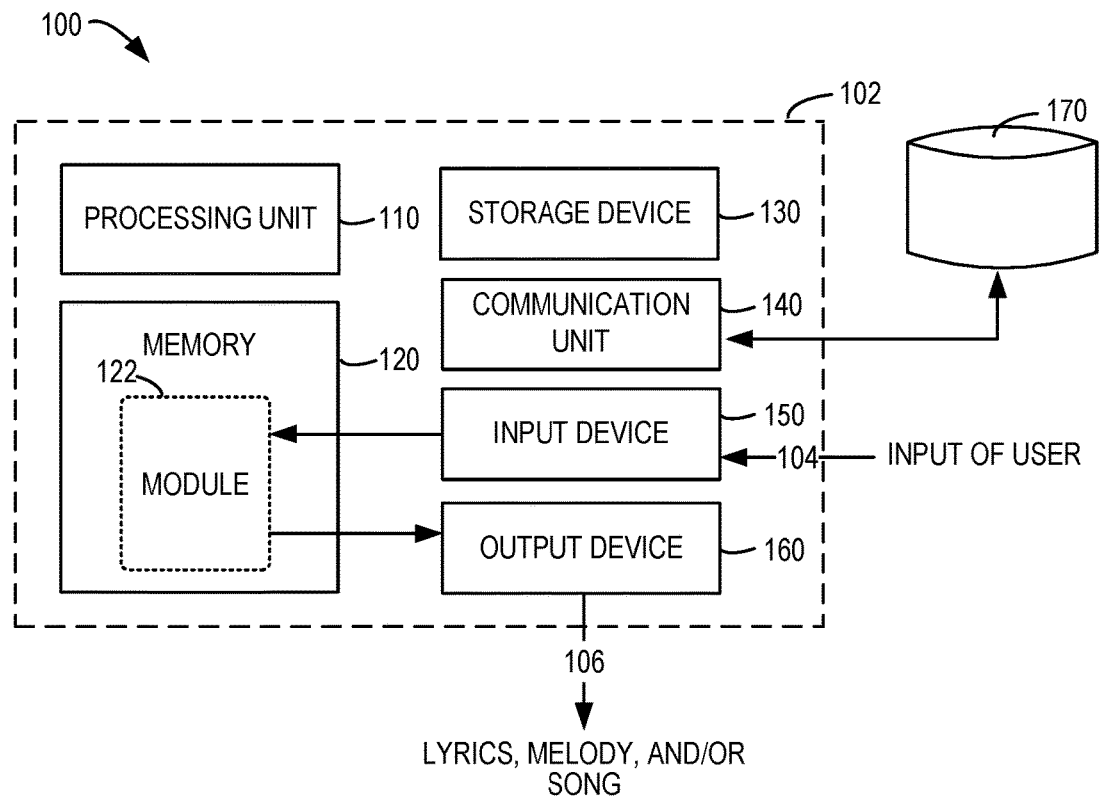
FIG. 1 illustrates a block diagram of a computing environment in which implementations of the subject matter described herein can be implemented.

FIG. 1 illustrates a block diagram of a computing environment 100 in which implementations of the subject matter described herein can be implemented. It would be appreciated that the computing environment 100 shown in FIG. 1 is merely for purpose of illustration but will not limit the function and scope of the implementations of the subject matter described herein in any way. As shown in FIG. 1, the computing environment 100 includes a computing device 102 in form of a general-purpose computing device. Components of the computing device 102 may include, but are not limited to, one or more processors or processing units 110, a memory 120, a storage device 130, one or more communication units 140, one or more input devices 150, and one or more output devices 160.

In some implementations, the computing device 102 may be implemented as various user terminals or service terminals. The service terminals may be a server or large-scale computing device, and other devices provided by various service providers. The user terminals are, for example, any type of mobile terminals, fixed terminals, or portable terminals, including mobile phones, stations, units, devices, multimedia computers, multimedia tablets, Internet nodes, communicators, desktop computers, laptop computers, notebook computers, netbook computers, tablet computers, Personal Communication System (PCS) devices, personal navigation devices, Personal Digital Assistants (PDAs), audio/video players, digital camera/camcorders, positioning devices, television receivers, radio broadcast receivers, electronic book devices, game devices, or any combination thereof, including the accessories and peripherals of these devices or any combination thereof. It is also contemplated that the computing device 102 can support any type of interface to the user (such as "wearable" circuitry and the like).

The processing unit 110 can be a physical or virtual processor and perform various processes based on programs stored in the memory 120. In a multiprocessor system, multiple processing units execute computer executable instructions in parallel to improve the parallel processing capability of the computing device 102. The processing unit 110 can also be referred to as a central processing unit (CPU), microprocessor, controller, or microcontroller.

The computing device 102 typically includes various computer storage media. Such media can be any media accessible to the computing device 102, including but not limited to volatile and non-volatile media, and removable and non-removable media. The memory 120 can be a volatile memory (for example, a register, cache, or Random Access Memory (RAM)), non-volatile memory (for example, a Read-Only Memory (ROM), Electrically Erasable Programmable Read-Only Memory (EEPROM), or flash memory), or any combination thereof. The memory 120 may include one or more program modules 122 configured to perform functions of various implementations described herein. The module 122 may be accessed and operated by the processing unit 110 to implement the corresponding functions. The storage device 130 can be any removable or non-removable media and may include machine-readable media, which can be used for storing information and/or data and can be accessed within the computing device 102.

Functions of components in the computing device 102 can be implemented in a single computing cluster or a plurality of computing machines that are communicated with each other via communication connections. Therefore, the computing device 102 can be operated in a networking environment using a logic link with one or more other servers, personal computers (PCs), or other general network nodes. The computing device 102 can further communicate, via the communication unit 140, with one or more external devices (not shown) such as a database 170, other storage devices, a server, a display device, and the like, or communicate with one or more devices enabling the user to interact with the computing device 102, or communicate with any devices (for example, a network card, modem, and the like) that enable the computing device 102 to communicate with one or more other computing devices. Such communication can be performed via input/output (I/O) interfaces (not shown).

The input device 150 may include one or more input devices such as a mouse, keyboard, tracking ball, voice input device, and the like. The output device 160 may include one or more output devices such as a display, loudspeaker, printer, and the like. In some implementations of automatic song generation, the input device 150 receives an input 104 from a user. Depending on the types of content that the user desires to input, the different types of input devices 150 may be used to receive the input 104. The input 104 is provided to the module 122 so that the module 122 determines, based on the input 104, a creation intention of the user with respect to the song and thus generates the corresponding melody and/or lyrics of the song. In some implementations, the module 122 provides the generated lyrics, melody, and/or the song formed by the lyrics and melody, as an output 106 to the output device 160 for output. The output device 160 may provide the output 106 in one or more forms such as a word, an image, an audio, and/or a video.

Example implementations for automatically generating lyrics, melody and song in the module 122 will be discussed in detail below.

Generation of Lyrics and Melody

Figure 2:
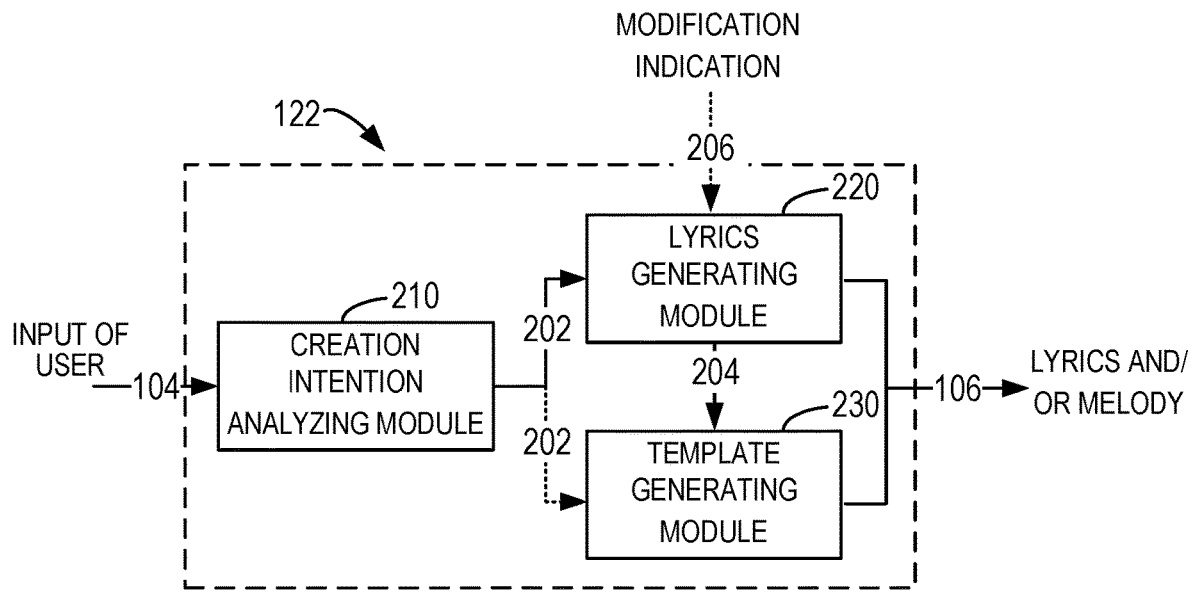
FIG. 2 illustrates a block diagram of a system for automatic song generation in accordance with some implementations of the subject matter described herein.

FIG. 2 illustrates a block diagram of a system for automatic song generation in accordance with some implementations of the subject matter described herein. In some implementations, the system may be implemented as the module 122 in the computing device 102. In the implementation of FIG. 2, the module 122 is implemented for automatically generating lyrics and a melody. As shown, the module 122 includes a creation intention analyzing module 210, a lyrics generating module 220, and a template generating module 230. According to the implementations of the subject matter described herein, the creation intention analyzing module 210 is configured to receive the input 104 from a user, and determine, based on the input 104, a creation intention 202 of the user with respect to a song to be generated. The input 104 may be received from the user via the input device 150 of the computing device 102, and provided to the creation intention analyzing module 210.

In some implementations, the creation intention analyzing module 210 may analyze or determine the creation intention 202 based on a specific type of the input 104 or various different types of the input 104. Examples of the input 104 may be words input by the user, such as key words, dialogue between characters, labels, and various documents including words. Alternatively, or in addition, the input 104 may include images in various formats, videos and/or audios with various length and formats, or the like. The input may be received from the user via a user interface provided by the input device 150. In this case, according to the implementations of the subject matter described herein, it is possible to allow the user to control the song to be generated (including the lyrics and/or melody of the song) through simple input, without requiring the user to have music theory knowledge to guide the generation of lyrics, melody and/or song.

The creation intention of the user with respect to the song refers to one or more features in the input 104 of the user that are expected to be expressed by the song to be generated, including the theme, feeling, tone, style, key elements of the song, and/or the like. For example, if the input 104 is a family photo and the facial expressions of family members in the photo show happiness, the creation intention analyzing module 210 may analyze that the creation intention of the user is to generate song with a theme of "family," with an overall "happy" emotion, and the like.

Depending on the type of the input 104, the creation intention analyzing module 210 may apply different analysis technologies to extract the creation intention 202 from the input 104. For example, if the input 104 include a word(s), the creation intention analyzing module 210 may employ a natural language processing or text analysis technology to analyze the theme, emotion, key elements and the like described in the input word(s).

As another example, if the input 104 is an image, the creation intention analyzing module 210 may apply various image analysis technologies, such as image recognition, human face recognition, posture recognition, emotion detection, gender and age detection, to analyze objects and characters included in the image and information such as the expressions, postures and emotions of those objects and characters, so as to determine the overall theme, emotion, key elements shown in the image (for example, human beings, objects, environment, events, and the like included in the image).

Alternatively, or in addition, the creation intention analyzing module 210 may obtain other features associated with the image, such as the size, format, type (for example, an oil painting, line drawing, clip picture, or black-white image), overall tone, associated labels (which may be added by the user or automatically added), and metadata of the image. Then, the creation intention 202 is analyzed and determined based on the obtained information.

Figure 3:
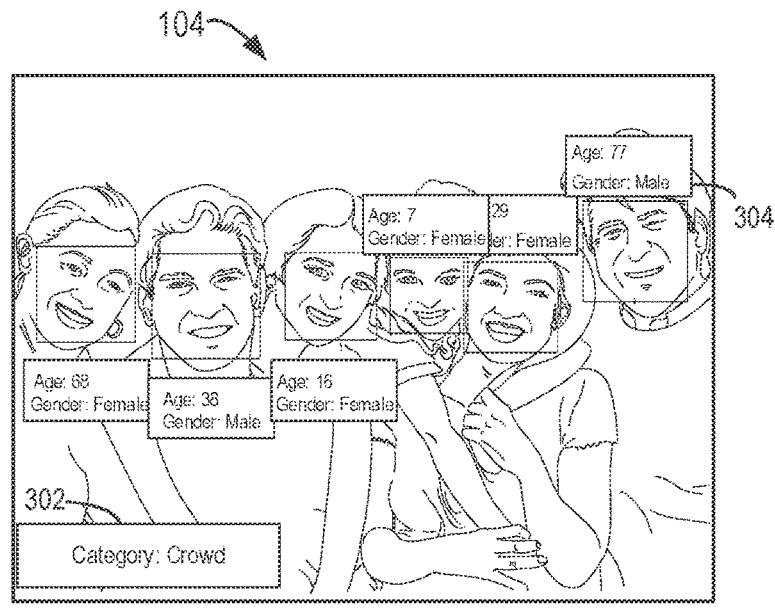
FIG. 3 illustrates a schematic diagram of analysis of creation intention from a user input in accordance with some implementations of the subject matter described herein.

FIG. 3 illustrates a schematic diagram of analysis of creation intention of the input 104. In this example, the input 104 is an image. After reception of the image 104, the creation intention analyzing module 210 may employ a human face recognition and posture recognition technology to determine that the image 104 includes multiple characters, and then determine that the category of the image 104 is "crowd", as shown by the label 302 in FIG. 3. Furthermore, the creation intentional analyzing module 210 may further analyze the age and gender of each character in the image 104 (as shown in the label 304) based on gender and age detection and human face recognition, and may then determine, based on the ages, genders, and other information (such as human face similarity) that the crowd included in the image 104 is a family.

In addition, it is possible to determine, from the expression detection technology, image recognition technology and image analysis technology, that the overall emotion of people in the image 104 is happiness and the people are in an outdoor environment. Therefore, the creation intention analyzing module 210 may determine that the creation intention of the user is to create a song to celebrate the happiness of the family. The song may include elements such as "outdoor", "closed," and "individuals". Of course, the creation intention analyzing module 210 may continue to determine information such as the type, format and size of the image 104 to further assist the determination of the creation intention.

In other examples, if the input 104 includes an audio and/or video, the creation intention analyzing module 210 may apply speech analysis technology (for the audio and video) and image analysis technology (for the video) to determine specific content included in the input audio and/or video. For example, it is possible to perform the analysis by converting speech in the audio and/or video into words and then using the above-mentioned natural language processing or text analyzing technology. It is also feasible to use the above-mentioned image analysis technology to analyze one or more frames of the video. In addition, spectrum properties of the speech in the audio and/or video may be analyzed to determine emotions of characters expressed by the audio and/or video or to identify the theme related to the speech.

It would be appreciated that the task of analyzing the creation intention can be performed by using various analysis technologies that are currently used or to be developed in the future, as long as the technologies can analyze corresponding types of words, images, audios and/or videos of input in one or more aspects to facilitate the song creation. In these implementations, the input 104 may include many types of input, and a corresponding analysis technology may be employed to analyze each of the types of input. Analysis results obtained from the different types of input may be combined to determine the creation intention 202. In some implementations, if the input 104 includes an explicit creation intention indication, for example, an indication of some aspects of the song such as the style and emotion, an indication of some key elements of the song, or an indication of partial melody, the explicit creation intention may be extracted from the input 104. Although some examples of creation intention have been listed, it would be appreciated that other aspects that would affect the features of the song may also be analyzed from the input of the user and the scope of the subject matter described herein is not limited in this regard.

Further referring to FIG. 2, the creation intention 202 determined by the creation intention analyzing module 210 may be provided as a key word(s) to the lyrics generating module 220 to guide lyrics generation in the lyrics generating module 220. Specifically, the lyrics generating module 220 is configured to generate the lyrics of the song based on the creation intention 202. The creation intention 202 may guide the lyrics generated by the lyrics generating module 220 to represent one or more aspects of the corresponding theme, emotion, and/or various key elements indicated by the creation intention.

In some implementations, the lyrics generating module 220 may select, from one or more pieces of existing lyrics, the lyrics 204 conforming to the creation intention 202. The existing lyrics may include lyrics included in various existing songs, or texts such as written poetry that can be sung. The existing lyrics may be classified, according to their themes, styles and contents, into different themes, emotions and/or key elements. The classification result may be stored as tag information in association with the existing lyrics and stored in, for example, the local storage device 130 of the computing device 102 and/or an external storage device such as the database 170. In generation of the lyrics, the lyrics generating module 220 may compare information indicated by the creation intention 202, such as the theme, emotion and/or various key elements, with the tag information of the existing lyrics, and select a piece of matched lyrics as the lyrics 204. In some implementations, if a plurality of pieces of matched lyrics are determined, one or more pieces of lyrics may be selected by the user as the output lyrics 204.

In some other implementations, the lyrics generating module 220 may use a predefined lyrics generation model to generate the lyrics. Such lyrics generation model may be trained as having a capability of generating corresponding lyrics based on the input creation intention 202 in various different aspects so that the lyrics can represent one or more aspects of the creation intention, for example, comply with a corresponding song theme, express a song mood, and/or include some key elements. In some implementations, if the creation intention 202 obtained by the lyrics generating module 220 from the creation intention analyzing module 210 cannot cover all aspects of the creation intention required by the lyrics generation model due to the limited user input 104, values of other aspects may be set as void so that the lyrics generating module 220 may use the limited creation intention 202 as input of the lyrics generation model to generate the lyrics. It would be appreciated that in some implementations, if the creation intention 202 includes the explicit indication of the user with respect to the lyrics, for example, some key elements or words to be included by the lyrics, the lyrics generating module 220 may also take the indication into consideration when generating the lyric, so as to obtain lyrics that explicitly indicate the creation intention.

In some examples, the lyrics generation model may be built based on a neutral network-based model such as a recurrent neutral network (RNN)-based model, or any other learning models. The lyrics generation model may be trained using a plurality of pieces of existing lyrics. The existing lyrics may include lyrics included in various existing songs, or texts that can be sung, such as the composed poems. Upon training, the existing lyrics may be classified, according to their themes, styles and contents, into different themes, emotions and/or key elements. The lyrics generation model is trained to generate the corresponding lyrics 204 upon reception of the creation intention 202. In this case, specific creation intentions may be used as training data of the lyrics generating module 220, so that the lyrics generation model can learn, from the training data, a capability of generating the lyrics for any specific creation intention. The trained lyrics generation model may be stored partially or totally in the local storage device 130 of the computing device 102, and/or an accessible external device such as the database 170. It would be appreciated that the lyrics generating model may be obtained using various model structures and/or training methods that are currently known or to be developed in the future. The scope of the subject matter described herein is not limited in this regard.

After the lyrics is selected from the existing lyrics and/or generated by the lyrics generation model, in some implementations, the lyrics generating module 200 may directly provide the lyrics to the template generating module 230 or use the lyrics as the output 106 of the module 122. Alternatively, the user may be provided with a modification to the automatically-generated lyrics. The lyrics generating module 220 may first output the lyrics selected from the existing lyrics and/or generated by the lyrics generation model to the user as candidate lyrics, which may, for example, be displayed by the output device 160 to the user in form of a text and/or played to the user in form of audio. The user may input a modification indication 206 to the candidate lyrics via the input device 150. Such modification indication 206 may indicate adjustment of one or more words in the candidate lyrics, for example, replacement of the words with other words or modification of an order of the words. Upon receiving the input modification indication 206 for the lyrics from the user, the lyrics generating module 220 modifies the candidate lyrics based on the input modification indication 206 to obtain the lyrics of the song.

The lyrics 204 generated by the lyrics generating module 220 is provided to the template generating module 230 to guide the generation of the template for the song. The template generating module 230 is configured to generate the template for the song based on the lyrics 204. The template for the song may indicate at least the melody of the song, which may be represented as a duration of a phoneme, a pitch trajectory, a sound intensity trajectory, and other various parameters for generating the melody. Since the lyrics of the song have been determined, upon generating the template for the song, the template generating module 230 can cause the template to match with the lyrics. Specifically, the template generating module 230 may determine a distribution of the lyrics 204, including, for example, the number of words in each section of the lyrics, the duration of each phoneme of a word, the pitch trajectory, the sound intensity trajectory, and the like, thereby combining them to obtain the melody. By generating the melody in this way, the melody matches the lyrics such that the song formed by such lyrics and melody can be easily sung.

In some implementations, the template generating module 230 may concatenate, based on the lyrics 204, melody segments of one or more existing songs into the melody of the song. Specifically, the template generating module 230 may divide in advance the melodies of one or more existing songs into a plurality of melody segments, which are referred to as candidate melody segments. The division of such melody segments may be performed on the basis of one or more syllables of a melody, and the segments may have any identical or different lengths. It is also possible that the existing songs are divided manually by a professional(s). The plurality of candidate melody segments obtained from the division may be used as a basis for subsequent melody generation, and may be stored partially or totally in the local storage device 130 of the computing device 102 and/or an accessible external device such as the database 170.

After receiving the lyrics 204 from the lyrics generating module 220, the template generating module 230 may divide the lyrics 204 into a plurality of lyrics segments and select, from the plurality of candidate melody segments, a candidate melody segment(s) for each of the lyrics segments. A lyrics segment may have a predefined length or may be divided by the structure of words included in the lyrics 204. In selection of a candidate melody segment for each lyrics segment, the candidate melody segment may be selected as matching with the distribution of words included in the lyrics segment so that the lyrics segment can be sung in combination with the melody segment.

In some implementations, the template generating module 230 may predefine or train a pre-selection model to select a candidate melody segment(s) for each of the lyrics segments. The pre-selection model may be trained to have a capability of selecting a corresponding candidate melody segment(s) according to the input lyrics. For this purpose, different lyrics segments and known melody segments matching with these lyrics segments may be used as training data to train the pre-selection model. In addition, some negative samples (for example, some lyrics segments and melody segments that are not matching with these lyrics segments) may also be used to train the model so that the model has a capability of determining the correct and incorrect results. The pre-selection model may be stored partially or totally in the local storage device 130 of the computing device 102 and/or an accessible external device such as the database 170.

The template generating module 230 may select a corresponding candidate melody segment for each of the lyrics segments of the lyrics 204, and concatenate all the selected candidate melody segments in an order of the lyrics segments in the lyrics 204 to form the melody of the song. In some cases, the template generating module 230 may select a plurality of candidate melody segments that are matched for each lyrics segment. To construct the melody of the lyrics, in some implementations, the module output module 230 may randomly select a candidate melody segment from the plurality of candidate melody segments as the melody segment corresponding to the lyrics segment. In other implementations, since a smooth transition between melody segments is important for the quality of the created song, the template generating module 230 may further determine the candidate melody segments corresponding to the plurality of lyrics segments based on smoothness among the candidate melody segments selected for adjacent lyrics segments in the plurality of lyrics segments. The determined candidate melody segments may then be concatenated by the template generating module 230 into the melody of the song, thereby achieving a smooth transition between the melody segments and thus resulting in an overall sweet-sounding melody.

The smoothness between candidate melody segments may be determined using various technologies, examples of which include, but are not limited to, measuring by analyzing a pitch trajectory of melody in the melody segments, consistency between corresponding pitch trajectories and/or other aspects that may affect perception of listeners. In some implementations, the template generating module 230 may use a predefined smoothness determining model to determine whether two candidate melody segments has a smooth auditory transition. The smoothness determining model may be designed to output the smoothness based on various acoustic parameters of the input candidate melody segments, such as the spectrum, frequency, soundness, duration, and the like. The output may be a smoothness metric in a certain range or an indication (with a value 1 or 0) indicating whether the two input melody segments are smooth.

The template generating module 230 may input two candidate melody segments into the smoothness determining model, and determine, based on a comparison of the result output by the model and a predetermined threshold (or based on whether the result indicates a smooth result), whether the two candidate melody segments are smooth and can be concatenated together. Training data used for training such a smoothness determining model may include adjacent melody segment in existing songs s (as positive samples) and melody segments randomly selected from various segments of existing songs (as negative samples). In some examples, such model may, for example, be any of various neutral network-based models (for example, DNN-based models or long short-term memory (LSTM))-based models) or any other models capable of completing smoothness determination.

It would be appreciated that in addition to determining the melody of the song by selecting and concatenating the melody segments of existing songs, in other implementations, the template generating module 230 may further directly create, based on the lyrics 204, a template to indicate part or all of the melody of the song to be generated. For example, the template generating module 230 may generate the melody based on the lyrics using a predefined melody generation model. Such melody generation model may be trained based on known melody and corresponding lyrics. In some examples, the melody generation model may be built from a neutral network-based model, such as a recurrent neutral network (RNN)-based mode, and/or other learning models.

In addition to the lyrics 204, the template generating module 230 may generate the template for the song further based on the creation intention 202 provided from the creation intention analyzing module 210, so that the melody indicated by the template can represent the theme, emotion and/or key elements indicated by the creation intention 202. In some implementations, the creation intention 202 may be used to select the candidate melody segments divided from the existing song for concatenation of the melody of the song, so that the selected melody segments can not only match with the lyrics 204 but also represent the creation intention 202 individually and/or in combination. For example, if the creation intention 202 indicates that the emotion of the song to be generated is "happiness," the melody segment(s) that can express a happy emotion may be selected from the candidate melody segments for one or more lyrics segments. If the creation intention 202 further indicates other aspects that affect song creation, one or more candidate melody segments may also be selected for one or more lyrics segments based on those aspects correspondingly.

To select the candidate melody segments based on the creation intention 202, the pre-divided candidate melody segments may be classified according to the respective creation intentions such as the themes, emotions and/or the key elements included therein, and then the candidate melody segments may be determined based on a comparison of the classification result and the creation intention 202. In other implementations, the above-mentioned pre-selection model used by the template generating module 230 may also be trained to have a capability of selecting the candidate melody segments for each lyrics segment based on not only the lyrics segment but also the creation intention. In these implementations, the pre-selection model may be trained with training data including different training creation intentions, lyrics, and melody segments known as matching with these creation intentions. In addition, some negative samples (for example, some creation intentions and melody segments that are not matching with these creation intentions) may be used to train the model so that the model has a capability of determining the correct and wrong results. It would be appreciated that a separated model may be trained to select the candidate melody segments based on the creation intention 202. For example, one or more candidate melody segments may be selected based on a lyrics segment of the lyrics 204, and then the melody segment matching with the lyrics segment may be filtered from the selected candidate melody segments based on the creation intention 202, or vice versa.

In addition to selecting the existing candidate melody segments based on the creation intention 202 to generate the template for the song, the template generating module 230 may further directly create part or all of the melody indicated by the template based on the creation intention 202. For example, the melody generation model discussed above may be trained to output a corresponding melody based on the input creation intention 202 (and/or the input lyrics 204). In this case, the melody generation model may be trained with the creation intentions that are identified for the melodies of existing songs (for example, the themes, emotions, and/or key elements of the existing melody) so that the melody generation model has a capability of creating a melody based on a creation intention. In some implementations, if the creation intention 202 includes an explicit indication of the user with respect to the melody and/or the distribution of the lyrics, the template generating module 230 may also take these into account in generating the template so that the obtained template 204 can explicitly represent these creation intentions.

To further improve the user experience, the template generated based on the lyrics and/or the creation intention may be first presented to the user as an intermediate template. Then, the template generating module 230 may receive from the user a modification to the melody of the intermediate template, and obtain the final template based on the modification.

The template generated by the template generating module 230 may be provided individually or in combination with the lyrics generated by the lyrics generating module 220 as the output 106 of the output device 160 of the computing device 102, and may be output to the user in form of text and/or audio. In some examples, the melody of the template may be composed in form of numbered musical notations and/or five-line staff and displayed to the user, and the lyrics may be displayed in form of text and/or played in form of audio to the user.

The above discusses automatic generation of the melody and lyrics. In some alternative implementations, the melody indicated by the template may be combined with the lyrics to generate the song. Such song may also be played to the user. Example implementations of automatic song synthesis will be discussed below in detail.

Song Synthesis

Figure 4:
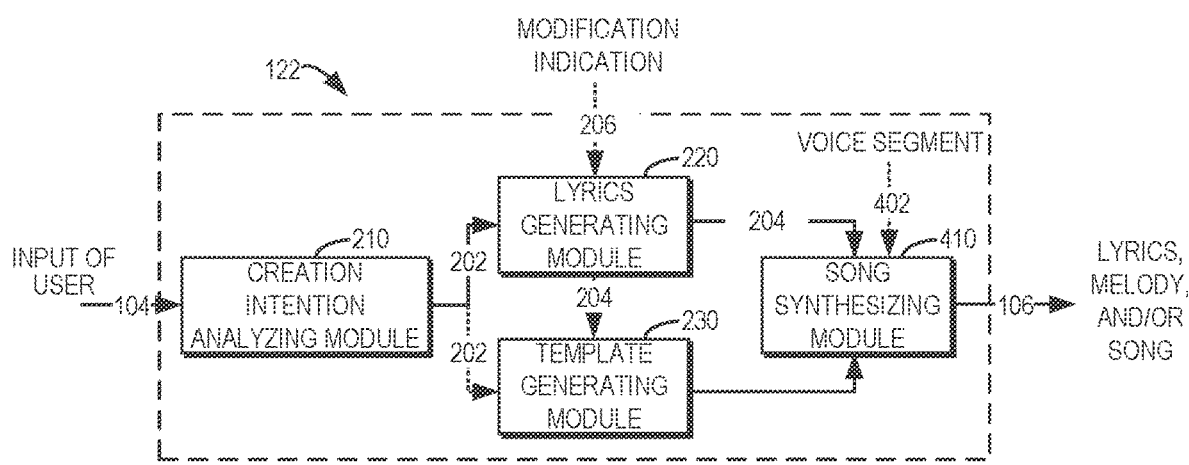
FIG. 4 illustrates a block diagram of a system for automatic song generation in accordance with some other implementations of the subject matter described herein.

FIG. 4 illustrates a block diagram of the module 122 according to implementations of automatic song synthesis. In the example shown in FIG. 4, in addition to automatic lyrics generation, the module 122 may further be used to perform automatic song synthesis based on the lyrics and melody. As shown in FIG. 4, the module 122 further includes a song synthesizing module 410. The song synthesizing module 410 receives the lyrics from the lyrics generating module 220 and the melody indicated by the template from the template generating module 230, and then combines the received lyrics and melody to generate the song that can be sung.

It would be appreciated that the song synthesizing module 410 shown in FIG. 4 is optional. In some cases, the module 122 may only provide separated lyrics and/or melody as shown in FIG. 2. In other cases, the song synthesizing module 410 combines the generated lyrics and melody into the song automatically or in response to a user input (for example, an instruction from the user to synthesize the song).

In some implementations, the song synthesizing module 410 may simply match with the lyrics with the melody, and then output the song 106 to the user. For example, the melody is composed in form of numbered musical notations or five-line staff and displayed on the display device where the lyrics are displayed in association with the melody. The user may sing the song by recognizing the melody and lyrics.

In some other implementations, the song synthesizing module 410 may further determine a corresponding voice of a singer for the song so that the song 106 may be directly played. Specifically, the song synthesizing module 410 may obtain a voice model that is capable of representing a voice characteristic of the singer, and then use the lyrics as input of the voice model to generate a voice spectrum trajectory for the lyrics. In this way, the lyrics may be read by the singer indicated by the voice model. To make the singer's reading of the lyrics sound rhythmic, the lyrics synthesizing module 410 further synthesize the voice spectrum trajectory and the melody indicated by the template into a song singing waveform, which represents song performance matching with the melody.

In some implementations, the lyrics synthesizing module 410 may use a vocoder to synthesize the voice spectrum trajectory with the melody. The resulting singing waveform may be provided to the output device 160 (for example, a loudspeaker) of the computing device 102 to play the song. Alternatively, the singing waveform may be provided by the computing device 102 to other external devices to play the song.

The voice model used by the song synthesizing module 410 to generate the voice spectrum trajectory of the lyrics may be a predefined voice model, which may be trained using several voice segments so that the corresponding voice spectrum trajectory can be generated based on input words or lyrics. The voice model may be constructed based on, for example, a hidden Markov model (HMM) model or various neural network-based models (e.g., a DNN-based or long short-term memory (LSTM)-based model). In some implementations, the voice model may be trained using a plurality of voice segments of a certain singer. In some other implementations, the voice model may be trained using a plurality of voice segments of different singers so that the voice model can represent average speech features of these singers. Such voice model may also be referred to an average voice model. The predefined voice model may be stored partially or totally in the local storage device 130 of the computing device 102, and/or an accessible external device such as the database 170.

In some cases, the user might expect that the song can be sung with personalized voice. Therefore, in some implementations, the song synthesizing module 410 may receive one or more voice segments 402 of a specific singer input by the user, and train the voice model based on the voice segments. Usually, the user-input voice segments might be limited and insufficient to train a voice model that can work well. Hence, the song synthesizing module 410 may use the received voice segments 402 to adjust the predefined average voice model so that the adjusted average voice model can represent a voice characteristic of a singer in the voice segments 402. Of course, in other implementations, it is also possible to require the user to input sufficient voice segments of one or more specific singers so that the corresponding voice model can be trained for the voice of the singer(s).

Example Process

Figure 5:
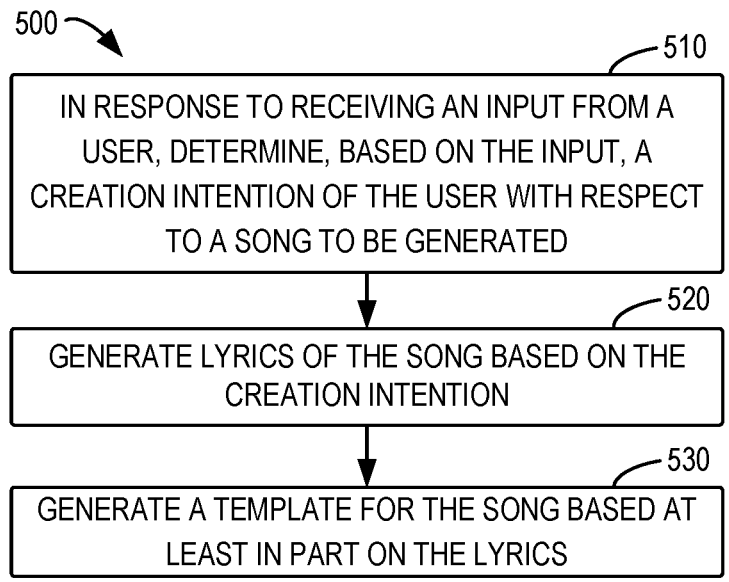
FIG. 5 illustrates a flowchart of a process of generating a song in accordance with some implementations of the subject matter described herein.

FIG. 5 illustrates a flowchart of a process of automatic song generation 500 in accordance with some implementations of the subject matter described herein. The process 500 may be implemented by the computing device 120, for example, may be implemented in the module 122 of the computing device 102.

At 510, in response to reception of an input from a user, the computing device 102 determines, based on the input, a creation intention of the user with respect to a song to be generated. At 520, the computing device 102 generates lyrics of the song based on the creation intention. At 530, the computing device 102 generates a template for the song based at least in part on the lyrics. The template indicates a melody matching with the lyrics. Furthermore, in some implementations, the computing device 102 may generate the template further based on the creation intention.

In some implementations, the process 500 may further combine the lyrics and the melody indicated by the template to generate the song.

In some implementations, generating the template may include dividing the lyrics into a plurality of lyrics segments; for each of the plurality of lyrics segments, selecting, from a plurality of candidate melody segments, at least one candidate melody segment matching with the lyrics segment; determining respective candidate melody segments corresponding to the plurality of lyrics segments based on smoothness among the candidate melody segments selected for adjacent lyrics segments in the plurality of lyrics segments; and concatenating the determined candidate melody segments into the melody indicated by the template.

In some implementations, generating lyrics based on the creation intention may include: generating candidate lyrics based on the creation intention; and modifying the candidate lyrics based on a further input received from the user to obtain the lyrics.

In some implementations, generating the lyrics based on the creation intention may include: obtaining a predefined lyrics generation model, the predefined lyrics generation model being obtained with at least one of the following:

existing lyrics and documents including words; and generating the lyrics based on the creation intention using the lyrics generation model.

In some implementations, the process 500 may further include obtaining a voice model representing a voice characteristic of a singer; generating a voice spectrum trajectory for the lyrics using the voice model; synthesizing the voice spectrum trajectory and the melody indicated by the template into a singing waveform of the song; and playing the song based on the singing waveform.

In some implementations, obtaining the voice model includes: receiving a voice segment of the singer; and obtaining the voice model by adjusting a predefined average voice model with the received voice segment, the average voice model being obtained with voice segments of a plurality of different singers.

In some implementations, the input includes at least one of an image, a word, a video, or an audio.

Example Implementations

Some example implementations of the subject matter described herein are listed below.

In one aspect, the subject matter described herein provides a computer-implemented method, comprising: in response to reception of an input from a user, determining, based on the input, a creation intention of the user with respect to a song to be generated; generating lyrics of the song based on the creation intention; and generating a template for the song based at least in part on the lyrics, the template indicating a melody matching with the lyrics.

In some implementations, the method further comprises combining the lyrics and the melody indicated by the template to generate the song.

In some implementations, generating the template comprises: dividing the lyrics into a plurality of lyrics segments; for each of the plurality of lyrics segments, selecting, from a plurality of candidate melody segments, at least one candidate melody segment matching with the lyrics segment; determining respective candidate melody segments corresponding to the plurality of lyrics segments based on smoothness among the candidate melody segments selected for adjacent lyrics segments in the plurality of lyrics segments; and concatenating the determined candidate melody segments into the melody indicated by the template.

In some implementations, generating the template further comprises: generating the template further based on the creation intention.

In some implementations, generating the lyrics based on the creation intention comprises: generating candidate lyrics based on the creation intention; and modifying the candidate lyrics based on a further input received from the user to obtain the lyrics.

In some implementations, generating the lyrics based on the creation intention comprises: obtaining a predefined lyrics generation model, the predefined lyrics generation model being obtained with at least one of the following: existing lyrics and documents including words; and generating the lyrics based on the creation intention using the lyrics generation model.

In some implementations, the method further comprises: obtaining a voice model representing a voice characteristic of a singer; generating a voice spectrum trajectory for the lyrics using the voice model; synthesizing the voice spectrum trajectory and the melody indicated by the template into a singing waveform of the song; and playing the song based on the singing waveform.

In some implementations, obtaining the voice model comprises: receiving a voice segment of the singer; and obtaining the voice model by adjusting a predefined average voice model with the received voice segment, the average voice model being obtained with voice segments of a plurality of different singers.

In some implementations, the input includes at least one of an image, a word, a video, or an audio.

In another aspect, the subject matter described herein provides a device. The device comprises a processing unit; and a memory coupled to the processing unit and including instructions stored thereon which, when executed by the processing unit, cause the device to perform acts including: in response to reception of an input from a user, determining, based on the input, a creation intention of the user with respect to a song to be generated; generating lyrics of the song based on the creation intention; and generating a template for the song based at least in part on the lyrics, the template indicating a melody matching with the lyrics.

In some implementations, the acts further include combining the lyrics and the melody indicated by the template to generate the song.

In some implementations, generating the template comprises: dividing the lyrics into a plurality of lyrics segments; for each of the plurality of lyrics segments, selecting, from a plurality of candidate melody segments, at least one candidate melody segment matching with the lyrics segment; determining respective candidate melody segments corresponding to the plurality of lyrics segments based on smoothness among the candidate melody segments selected for adjacent lyrics segments in the plurality of lyrics segments; and concatenating the determined candidate melody segments into the melody indicated by the template.

In some implementations, generating the template further comprises: generating the template further based on the creation intention.

In some implementations, generating the lyrics based on the creation intention comprises: generating candidate lyrics based on the creation intention; and modifying the candidate lyrics based on a further input received from the user to obtain the lyrics.

In some implementations, generating the lyrics based on the creation intention comprises: obtaining a predefined lyrics generation model, the predefined lyrics generation model being obtained with at least one of the following: existing lyrics and documents including words; and generating the lyrics based on the creation intention using the lyrics generation model.

In some implementations, the acts further include: obtaining a voice model representing a voice characteristic of a singer; generating a voice spectrum trajectory for the lyrics using the voice model; synthesizing the voice spectrum trajectory and the melody indicated by the template into a singing waveform of the song; and playing the song based on the singing waveform.

In some implementations, obtaining the voice model comprises: receiving a voice segment of the singer; and obtaining the voice model by adjusting a predefined average voice model with the received voice segment, the average voice model being obtained with voice segments of a plurality of different singers.

In some implementations, the input includes at least one of an image, a word, a video, or an audio.

In a further aspect, there is provided a computer program product tangibly stored on a transitory computer-readable medium and comprising machine-executable instructions which, when executed by a device, cause the device to, in response to reception of an input from a user, determine, based on the input, a creation intention of the user with respect to a song to be generated; generate lyrics of the song based on the creation intention; and generate a template for the song based at least in part on the lyrics, the template indicating a melody matching with the lyrics.

In some implementations, the machine-executable instructions, when executed by a device, further cause the device to combine the lyrics and the melody indicated by the template to generate the song.

In some implementations, the machine-executable instructions, when executed by a device, cause the device to: divide the lyrics into a plurality of lyrics segments; for each of the plurality of lyrics segments, select, from a plurality of candidate melody segments, at least one candidate melody segment matching with the lyrics segment; determine respective candidate melody segments corresponding to the plurality of lyrics segments based on smoothness among the candidate melody segments selected for adjacent lyrics segments in the plurality of lyrics segments; and concatenate the determined candidate melody segments into the melody indicated by the template.

In some implementations, the machine-executable instructions, when executed by a device, cause the device to: generate the template further based on the creation intention.

In some implementations, the machine-executable instructions, when executed by a device, cause the device to: generate candidate lyrics based on the creation intention; and modify the candidate lyrics based on a further input received from the user to obtain the lyrics.

In some implementations, the machine-executable instructions, when executed by a device, cause the device to: obtain a predefined lyrics generation model, the predefined lyrics generation model being obtained with at least one of the following: existing lyrics and documents including words; and generate the lyrics based on the creation intention using the lyrics generation model.

In some implementations, the machine-executable instructions, when executed by a device, further cause the device to: obtain a voice model representing a voice characteristic of a singer; generate a voice spectrum trajectory for the lyrics using the voice model; synthesize the voice spectrum trajectory and the melody indicated by the template into a singing waveform of the song; and play the song based on the singing waveform.

In some implementations, the machine-executable instructions, when executed by a device, cause the device to: receive a voice segment of the singer; and obtain the voice model by adjusting a predefined average voice model with the received voice segment, the average voice model being obtained with voice segments of a plurality of different singers.

In some implementations, the input includes at least one of an image, a word, a video, or an audio.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   in response to reception of an input from a user, determining, based on the input, a creation intention of the user with respect to a song to be generated;
   generating lyrics of the song that are unique and different than the input and based on the creation intention; and
   generating a template for the song that is unique and different than the input and based at least in part on the lyrics, the template indicating a melody matching with the lyrics.

2. The method of claim 1, further comprising:
   combining the lyrics and the melody indicated by the template to generate the song.

3. The method of claim 1, wherein generating the template comprises:
dividing the lyrics into a plurality of lyrics segments;
for each of the plurality of lyrics segments, selecting, from a plurality of candidate melody segments, at least one candidate melody segment matching with the lyrics segment;
determining respective candidate melody segments corresponding to the plurality of lyrics segments based on smoothness among the candidate melody segments selected for adjacent lyrics segments in the plurality of lyrics segments; and
concatenating the determined candidate melody segments into the melody indicated by the template.

4. The method of claim 1, wherein generating the template further comprises:
representing at least a theme or a key element in the generation of the template as indicated by the creation intention determined and based on the input of the user.

5. The method of claim 1, wherein generating the lyrics based on the creation intention comprises:
generating candidate lyrics based on the creation intention; and
modifying the candidate lyrics based on a further input received from the user to obtain the lyrics.

6. The method of claim 1, wherein generating the lyrics based on the creation intention comprises:
obtaining a predefined lyrics generation model, the predefined lyrics generation model being obtained with at least one of the following: existing lyrics and documents including words; and
generating the lyrics based on the creation intention using the lyrics generation model.

7. The method of claim 1, further comprising:
obtaining a voice model representing a voice characteristic of a singer;
generating a voice spectrum trajectory for the lyrics using the voice model;
synthesizing the voice spectrum trajectory and the melody indicated by the template into a singing waveform of the song; and
playing the song based on the singing waveform.

8. The method of claim 7, wherein obtaining the voice model comprises:
receiving a voice segment of the singer; and
training the voice model by using the received voice segment of the singer to adjust a predefined average voice model with the received voice segment, the average voice model being obtained with voice segments of a plurality of different singers.

9. The method of claim 1, wherein the input includes a video.

10. The method of claim 1, wherein determining the creation intention includes performing image recognition, human face recognition, or emotion detection to the input wherein the input is an image.

11. The method of claim 10, wherein the creation intention is further based on applying at least one of a posture recognition, a gender recognition, or an age recognition to the image.

12. The method of claim 10, wherein the creation intention is further based on determining a size, a format, or a type of the image.

13. The method of claim 1, wherein the method further includes, upon generating the template, causing the template and the melody to match the lyrics by at least determining a distribution of the lyrics based on at least one of a duration of phonemes for words in the lyrics, a pitch trajectory for the lyrics, or a sound intensity trajectory for the lyrics.

14. The method of claim 1, wherein the input comprises words and wherein determining the creation intention includes performing natural language processing on the input to determine an emotion associated with the words.

15. The method of claim 14, wherein the method further includes selecting the melody for the lyrics based on the emotion.

16. A device, comprising:
a processing unit; and
a memory coupled to the processing unit and including instructions stored thereon which, when executed by the processing unit, cause the device to perform acts including:
in response to reception of an input from a user, determining, based on the input, a creation intention of the user with respect to a song to be generated;
generating lyrics of the song that are unique and different than the input and based on the creation intention; and
generating a template for the song that is unique and different than the input and based at least in part on the lyrics, the template indicating a melody matching with the lyrics.

17. The device of claim 16, wherein the acts further include:
combining the lyrics and the melody indicated by the template to generate the song.

18. The device of claim 16, wherein generating the template comprises:
dividing the lyrics into a plurality of lyrics segments;
for each of the plurality of lyrics segments, selecting, from a plurality of candidate melody segments, at least one candidate melody segment matching with the lyrics segment;
determining respective candidate melody segments corresponding to the plurality of lyrics segments based on smoothness among the candidate melody segments selected for adjacent lyrics segments in the plurality of lyrics segments; and
concatenating the determined candidate melody segments into the melody indicated by the template.

19. The device of claim 16, wherein generating the lyrics based on the creation intention comprises:
generating candidate lyrics based on the creation intention; and
modifying the candidate lyrics based on a further input received from the user to obtain the lyrics.

20. The device of claim 16, wherein generating the lyrics based on the creation intention comprises:
obtaining a predefined lyrics generation model, the predefined lyrics generation model being obtained with at least one of the following: existing lyrics and documents including words; and
generating the lyrics based on the creation intention using the lyrics generation model.

* * * * *